United States Patent [19]

Rogers

[11] 4,286,403
[45] Sep. 1, 1981

[54] ONE WAY FISHING SINKER

[76] Inventor: Stanley L. Rogers, 3950 Dillard Rd., Eugene, Oreg. 97405

[21] Appl. No.: 144,164

[22] Filed: Apr. 25, 1980

[51] Int. Cl.³ ............................................. A01K 95/00
[52] U.S. Cl. .................................. 43/43.12; 43/42.53
[58] Field of Search ............................ 43/43.12, 42.53

[56] References Cited

U.S. PATENT DOCUMENTS

| | | | |
|---|---|---|---|
| 2,814,902 | 12/1957 | Matteson | 43/43.12 |
| 3,415,005 | 12/1968 | Gilham | 43/43.12 |
| 3,513,583 | 5/1970 | Leash | 43/43.12 |
| 3,685,196 | 8/1972 | Scott | 43/43.12 |
| 3,834,059 | 9/1974 | Overstreet | 43/43.12 |
| 3,854,235 | 12/1974 | Thompson | 43/43.12 |

Primary Examiner—Jimmy C. Peters
Attorney, Agent, or Firm—James D. Givnan, Jr.

[57] ABSTRACT

A disposable sinker including a water soluble member for attachment to a fishing line. An extension on the soluble member protrudes downwardly and is embedded within a solid body of the sinker. The soluble member defines openings for line passage and for water entry to expedite dissolution and sinker separation. A wax coating protects the soluble member from premature disintegration. A pull tab is provided which is removable prior to sinker use to expose a portion of the soluble member. A reinforcing agent is applied to the soluble member to resist line imparted forces. A method of manufacture is also provided.

18 Claims, 7 Drawing Figures

U.S. Patent  Sep. 1, 1981  4,286,403
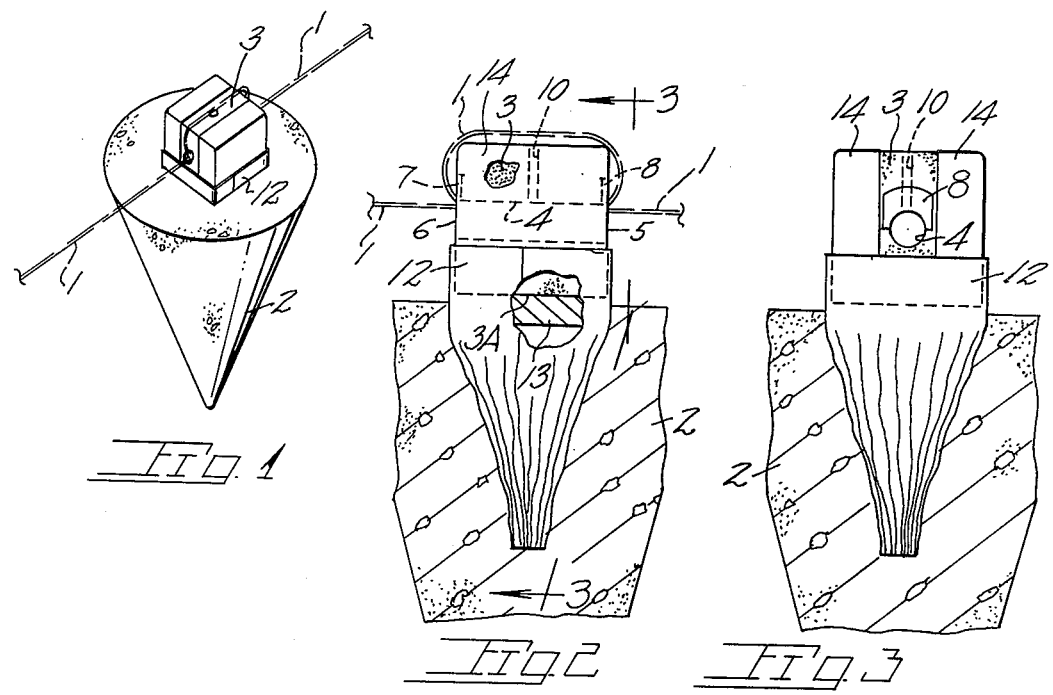
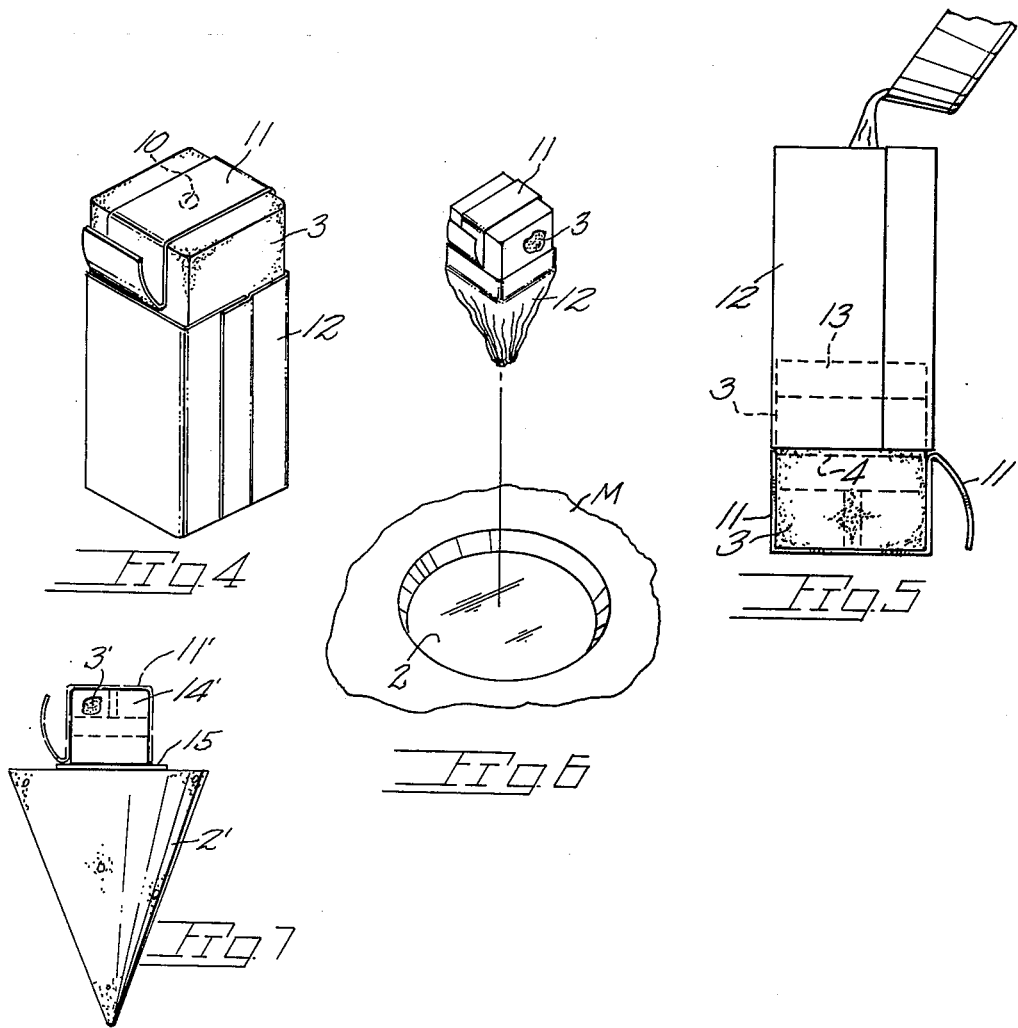

ONE WAY FISHING SINKER

BACKGROUND OF THE INVENTION

The present invention concerns sinkers for attachment to fishing lines and particularly to such a sinker that separates from the line after completion of a cast.

Within the prior art are fishing sinkers which separate from the line after casting or submergence. Such sinkers have as an objective the adding of weight to a line to facilitate making a cast without undesirable weighting of the line at the time of a fish strike or during subsequent playing of the fish. Further, some lures are best presented on or near the surface and accordingly it is desirable to release the weight immediately subsequent to completion of the cast. Additionally, a sinker temporarily attached to a fishing line allows a more accurate cast with less chance of the line fouling on brush adjacent the body of water or other obstacles.

While some prior art stinkers have been directed toward accomplishing these objectives, the same have not been widely accepted for one reason or another.

The prior art includes other soluble line attachments including the sinker disclosed in U.S. Pat. No. 3,393,467 formed from soluble material and shaped for line retention; the sinker disclosed in U.S. Pat. No. 3,415,005 of soluble material tethered to a fishing line; the sinker disclosed in U.S. Pat. No. 3,685,196 which utilizes a soluble connector for hook engagement; a soluble line connector disclosed in U.S. Pat. No. 3,724,120 and the soluble container for a fishing line weight disclosed in U.S. Pat. No. 3,854,235. U.S. Pat. No. 3,834,059 shows a sugar cube and weight.

SUMMARY OF THE PRESENT INVENTION

The present invention is embodied within a fishing sinker having two major components, one of which is water soluble to release the sinker from a submerged line segment.

Sinker weight is provided by a low cost, non-toxic weight to prevent harm to the body of water being fished. A water soluble component is securely combined with the weight component of the sinker to withstand forces encountered during casting without risk of separation. The water soluble component is treated with a reinforcing agent so as to better withstand forces imparted by the fishing line during casting.

A port in the soluble component is sized to provide the desired soluble rate so as to assure timely line-sinker separation. A pull tab covers both the port and an eye formed in the soluble component to prevent accidental degradation by ambient moisture. Similarly, the soluble component is coated with wax adjacent the pull tab area to seal the component from moisture prior to use.

Important objectives include a disposable or one way fishing sinker utilizing low cost components, such as sand cement and cube sugar yet one capable of withstanding severe forces encountered during casting; the provision of a one way sinker having a size port therein for timed line-sinker separation; the provision of a one way sinker including a water soluble component leaving no residue on the fishing line and reinforced at line contacting points; the provision of a one way sinker utilizing a sugar cube protected by a pull tab and wax coating to prevent disintegration by airborne moisture particles or moisture within a tackle box; the provision of a one way sinker wherein a water soluble component is securely attached to the weight component of the sinker by water resistant masking tape.

BRIEF DESCRIPTION OF THE DRAWING

In the accompanying drawing:

FIG. 1 is a perspective view of the present sinker in place on a segment of fishing line;

FIG. 2 is a vertical sectional view of the sinker with portions of the weight component removed for purposes of illustration;

FIG. 3 is a view taken along line 3—3 of FIG. 2;

FIG. 4 is a perspective view of the soluble component separated from the weight component;

FIG. 5 is an elevational view of the soluble component during fabrication of same; and FIG. 6 is a perspective view of the soluble component positioned for submergence within the weight component prior to setting of the latter.

FIG. 7 is a side view of a modified form of the invention.

DETAILED DESCRIPTION OF THE PREFERRED EMBODIMENT

With continuing attention to the drawing wherein applied reference numerals indicate parts similarly hereinafter identified, reference numeral 1 indicates a length of fishing line or leader attached to the sinker. A weight member or component 2 is shown as being of conical shape with other shapes and sizes being entirely satisfactory for present purposes. Details of weight component 2 are hereinafter provided.

Indicated at 3 is a soluble member of a water soluble assembly which member may be conveniently embodied in a sugar cube. Extending through cubic member 3 is a passageway 4 constituting an eye for the passage through of line segment 1. Individual preferences may dictate the particular type of knot or line securement to member 3. Applied to the opposite sides at 5 and 6 of soluble member 3 is a reinforcing agent at 7 and 8 which permeates the surface and renders the surface less susceptible to fracture by line imparted forces. A suitable reinforcing agent or hardener is a lacquer having an acetate and formaldehyde resin base such as used in fingernail polishes and fingernail hardener products. This material permeates member 3 where applied to provide a reinforced portion thereof extending inwardly from the side surfaces 5 and 6 of member 3 above the ends of eye 4.

A port at 10 is formed in soluble member 3 for the admission of water to the inside of the member for rapid dissolution. Port 10 desirably intersects eye or line passageway 4 to further enable rapid dissolution and disintegration of member 3.

A removable, adhesively backed pull tab at 11 covers a central surface of soluble member 3 and also the port and eye openings to prevent (along with a coating) premature degradation of the member by airborne moisture, condensation or rain water.

A length of water resistant masking tape is wrapped along its upper margin to form an extension 12 on the lower portion of soluble member 3 as shown in FIG. 4. After application of the tape, member 3 is inverted to the FIG. 5 position whereupon a small quantity of molten wax 13 is deposited on the upwardly disposed surface 3A of the soluble member to waterproof said surface.

The extension 12 formed by wrapped tape is then crimped to form a somewhat conical shape having a wrinkled exterior as shown in FIG. 6. The soluble assembly is then dipped in a wax bath so as to provide a coating 14 of all exposed surfaces.

Upon solidifying of the wax coating, the soluble member 3 with tape attached is partially immersed in weight component 2 which is in a heavy viscous state. As shown in FIG. 6, the viscous weight member 2 is confined within a mold M and is of a viscosity to support the soluble assembly to enable precise positioning of same in the viscous material. Upon weight member 2 hardening or setting, the soluble assembly is securely attached to weight member 2 to importantly avoid any risk of separation during subsequent casting of the sinker. Preferably to avoid any risk of premature dissolution of member 3 during manufacture, by moisture from weight member 2, said member is placed so as to have its lowermost or wax coated surface 3A above the uppermost surface of weight member 2 as shown in FIGS. 2 and 3.

As earlier mentioned, soluble member 3 may be embodied within a sugar cube with line attachment eye 4 being approximately ⅛th inch diameter with port 10 being somewhat less in diameter. A satisfactory port size has been found to be 1/32nd of an inch.

When the present sinker is formed with a weight component of less than ⅜ths of an ounce, it is permissable to dispense with the application of the hardener agent as the loads imparted to the soluble member during casting are unlikely to fracture same. Weight members up to approximately three ounces may be utilized and incur the maximum application of hardener agent. To avoid leaving any residue on the fishing line segment, the hardening agent is applied only partially about the eye openings. The hardener is waterproof and serves to "cement" the affected sugar crystals into a solid mass.

Weight member 2 is satisfactorily formed from high density material such as sand cement though other equally suitable like material may be utilized.

In use, pull tab 11 is removed from the sinker exposing the ends of eye 4 and the upper terminus of port 10. The fishing line or leader is suitably secured to the sinker per the user's preference. Casting may be accomplished in the usual manner with the sinker serving to contribute to both casting range and accuracy. Water entering port 10 as well as eye 4 serves to rapidly dissolve the sugar crystals to the extent that sinker separation from the line segment occurs within a matter of seconds.

In FIG. 7 I show a side elevational view of a modified form of the invention wherein soluble member 3' of the above described type is secured to the upper surface of a weight member 2' by adhesive means at 15 which may be a quantity of a suitable glue or a double sided, pressure sensitive adhesive tape segment. The soluble member 3' is formed as earlier described with the exception that extension 12 is dispensed with.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A one way disposable sinker for attachment to a fishing line segment, said sinker comprising,
a weight member,
a water soluble assembly including a water soluble member including means for line attachment, an extension in place on said member and at least partially embedded within said weight member, said soluble member dissolvable upon immersion to release the weight member from the line.

2. The sinker claimed in claim 1 additionally including a hardener agent applied to the soluble member to resist line imparted forces.

3. The sinker claimed in claim 2 additionally including a separable tab in place on said soluble member and removable prior to sinker use.

4. The sinker claimed in claim 3 wherein said soluble member additionally defines a port for water entry.

5. The sinker claimed in claim 3 additionally including a water resistant coating in place on said soluble member.

6. The sinker claimed in claim 5 additionally including a body of water resistant material interiorly disposed within said extension and against said soluble member.

7. The sinker claimed in claim 1 wherein said extension is of crimped shape at one end for retentive engagement with said weight member.

8. The method of forming a one way disposable sinker including the steps of,
shaping a soluble member to receive a later attached fishing line,
applying an extension to said soluble member,
immersing the soluble member and extension within a water resistant liquid to coat same,
embedding said extension into a mold confined viscous quantity of high density setting material so as to leave exposed a portion of said soluble member, and
removing the joined soluble and molded member from the mold subsequent to setting of the high density material.

9. The method claimed in claim 8 additionally including the step of applying a hardener agent to said soluble member after the step of shaping said soluble member.

10. The method claimed in claim 9 additionally including the step of applying a tab in place on the soluble member prior to the step of immersing the soluble member.

11. The method claimed in claim 10 additionally including the step of forming a port in said soluble member subsequent to shaping of said member.

12. The method claimed in claim 10 additionally including the step of depositing a water resistant material on the soluble member interiorly of said extension subsequent to the step of embedding said extension in the soluble member.

13. The method claimed in claim 12 additionally including the step of deforming the protruding portion of said extension subsequent to the step of depositing the water resistant material on said soluble member.

14. A one way disposable sinker for attachment to a fishing line segment, said sinker comprising,
a weight member,
a water soluble member including means for line attachment,
adhesive means interposed between the members securing same to one another.

15. The sinker claimed in claim 14 additionally including a hardener agent applied to the soluble member to resist line imparted forces.

16. The sinker claimed in claim 15 additionally including a separable tab in place on said soluble member and removable prior to sinker use.

17. The sinker claimed in claim 16 wherein said soluble member additionally defines a port for water entry.

18. The sinker claimed in claim 16 additionally including a water resistant coating in place on said soluble member.

* * * * *